United States Patent
Ashley et al.

(10) Patent No.: US 6,714,603 B2
(45) Date of Patent: Mar. 30, 2004

(54) ASYNCHRONOUS TIMING FOR INTERPOLATED TIMING RECOVERY

(75) Inventors: Jonathan Ashley, Los Gatos, CA (US); Matthias Driller, Santa Cruz, CA (US)

(73) Assignee: Infineon Technologies North America Corp., Iselin, NJ (US)

( * ) Notice: Subject to any disclaimer, the term of this patent is extended or adjusted under 35 U.S.C. 154(b) by 0 days.

(21) Appl. No.: 10/293,090

(22) Filed: Nov. 12, 2002

(65) Prior Publication Data

US 2003/0076903 A1 Apr. 24, 2003

Related U.S. Application Data (63) Continuation of application No. 09/497,301, filed on Feb. 2, 2000, now Pat. No. 6,493,403.

(51) Int. Cl.[7] .............................................. H04L 27/14
(52) U.S. Cl. ....................................................... 375/326
(58) Field of Search ................................. 375/284, 285, 375/346, 231; 708/290, 440, 235, 276, 313, 445; 381/71.1, 94.1, 94.4; 455/570; 370/286, 290; 379/392, 406, 410

(56) References Cited

U.S. PATENT DOCUMENTS

| | | | |
|---|---|---|---|
| 4,897,740 A | 1/1990 | Suzuki | |
| 5,379,160 A | 1/1995 | Otani | |
| 5,717,619 A * | 2/1998 | Spurbeck et al. | 708/319 |
| 5,726,818 A | 3/1998 | Reed et al. | |
| 5,729,396 A | 3/1998 | Dudley et al. | |
| 5,754,352 A | 5/1998 | Behrens et al. | |
| 5,760,984 A | 6/1998 | Spurbeck et al. | |
| 5,812,334 A | 9/1998 | Behrens et al. | |
| 5,835,295 A * | 11/1998 | Behrens | 360/51 |
| 5,852,524 A | 12/1998 | Glover et al. | |
| 5,892,632 A | 4/1999 | Behrens et al. | |
| 5,901,010 A | 5/1999 | Glover et al. | |
| 5,909,332 A | 6/1999 | Spurbeck et al. | |
| 6,009,549 A | 12/1999 | Bliss et al. | |
| 6,157,604 A * | 12/2000 | Feyh et al. | 369/59.21 |
| 6,226,661 B1 * | 5/2001 | Savell | 708/313 |
| 6,324,235 B1 * | 11/2001 | Savell et al. | 375/372 |
| 6,487,672 B1 * | 11/2002 | Byrne et al. | 713/400 |
| 6,493,403 B1 * | 12/2002 | Ashley et al. | 375/326 |
| 6,590,948 B1 * | 7/2003 | Genrich | 375/355 |

* cited by examiner

Primary Examiner—Emmanuel Bayard
(74) Attorney, Agent, or Firm—Fish & Richardson P.C.

(57) ABSTRACT

A quotient $(y_2-y_0)/(y_3-y_1)$ is generated by circuitry where $Y_k$ are asynchronous samples from a sequence of asynchronous samples, the quotient $(y_2-y_0)/(y_3-y_1)$ is compared to a plurality of predetermined fractions with a comparator, and an initial interpolation interval value ($\mu 0$) stored in a lookup table is selected by circuitry based on the comparison of the quotient to the plurality of predetermined fractions. The predetermined fractions can represent boundary points and the quotient can fall between an interval defined by two of the boundary points. The selected initial interpolation value ($\mu 0$) can be the average of two calculated values of ($\mu$) using values of two predetermined fractions associated with the two boundary points between which the quotient falls.

9 Claims, 6 Drawing Sheets

| $h_i$ | $p_i$ | $q_i$ | $r_i$ | $\delta_i$ | $h_{i+1}$ |
|---|---|---|---|---|---|
| 0 | 1 | 1 | 0 | 1 | 1 |
| 0 | 1 | 0 | 0 | −1 | 1 |
| 1 | 1 | 1 | 1 | −1 | 2 |
| 1 | 0 | 1 | 1 | 1 | 2 |
| 2 | 0 | 1 | 0 | −1 | 3 |
| 2 | 0 | 0 | 0 | 1 | 3 |
| 3 | 1 | 0 | 1 | 1 | 0 |
| 3 | 0 | 0 | 1 | −1 | 0 |

Sample Interpolation Filter Coefficient $c_{\mu,i}$

|       | i=−2   | −1      | 0      | 1      | 2       | 3      |
|-------|--------|---------|--------|--------|---------|--------|
| μ=0   | 0      | −0.0078 | 1.0000 | 0.0156 | −0.0078 | 0      |
| 1     | 0.0078 | −0.0312 | 0.9922 | 0.0469 | −0.0156 | 0.0078 |
| 2     | 0.0156 | −0.0547 | 0.9844 | 0.0859 | −0.0312 | 0.0156 |
| 3     | 0.0234 | −0.0703 | 0.9688 | 0.1250 | −0.0391 | 0.0156 |
| 4     | 0.0312 | −0.0859 | 0.9531 | 0.1562 | −0.0547 | 0.0234 |
| 5     | 0.0312 | −0.1016 | 0.9375 | 0.1953 | −0.0625 | 0.0234 |
| 6     | 0.0391 | −0.1172 | 0.9219 | 0.2344 | −0.0781 | 0.0312 |
| 7     | 0.0391 | −0.1250 | 0.8984 | 0.2734 | −0.0859 | 0.0312 |
| 8     | 0.0469 | −0.1328 | 0.8672 | 0.3203 | −0.1016 | 0.0391 |
| 9     | 0.0469 | −0.1406 | 0.8438 | 0.3594 | −0.1094 | 0.0391 |
| 10    | 0.0469 | −0.1484 | 0.8125 | 0.3984 | −0.1172 | 0.0469 |
| 11    | 0.0547 | −0.1562 | 0.7812 | 0.4453 | −0.1250 | 0.0469 |
| 12    | 0.0547 | −0.1562 | 0.7500 | 0.4844 | −0.1328 | 0.0469 |
| 13    | 0.0547 | −0.1562 | 0.7188 | 0.5234 | −0.1406 | 0.0547 |
| 14    | 0.0547 | −0.1562 | 0.6797 | 0.5625 | −0.1484 | 0.0547 |
| 15    | 0.0547 | −0.1562 | 0.6406 | 0.6016 | −0.1484 | 0.0547 |
| 16    | 0.0547 | −0.1484 | 0.6016 | 0.6406 | −0.1562 | 0.0547 |
| −     | ...    | ...     | ...    | ...    | ...     | ...    |

FIG. 9

ASYNCHRONOUS TIMING FOR INTERPOLATED TIMING RECOVERY

CROSS REFERENCE TO RELATED APPLICATIONS

This application is a continuation (and claims the benefit of priority under 35 USC 120) of U.S. application Ser. No. 09/497,301, filed Feb. 2, 2000 now U.S. Pat. No. 6,493,403, and is related to U.S. application Ser. No. 09/496,617, filed Feb. 2, 2000.

BACKGROUND OF THE INVENTION

1. Field of the Invention

The present invention relates to magnetic recording and, particularly, to an improved system and method for interpolated timing recovery.

2. Description of the Related Art

In digital communications receivers, timing recovery circuits are used to acquire and then track the correct sampling and frequency of an analog signal. In an interpolated timing recovery circuit, this is accomplished by digitally resampling a stream of asynchronous samples of the analog signal. The digital resampling effectively reconstructs the values the signal takes on at points in time between the (asynchronous) times at which the signal was actually sampled. This is done by mathematically interpolating the asynchronous sample values of the signal. To allow for small errors in frequency, and to satisfy the Nyquist sampling criterion, the resampling period $T_s$ is slightly longer than the asynchronous sampling period $T_a$.

Figure 1:
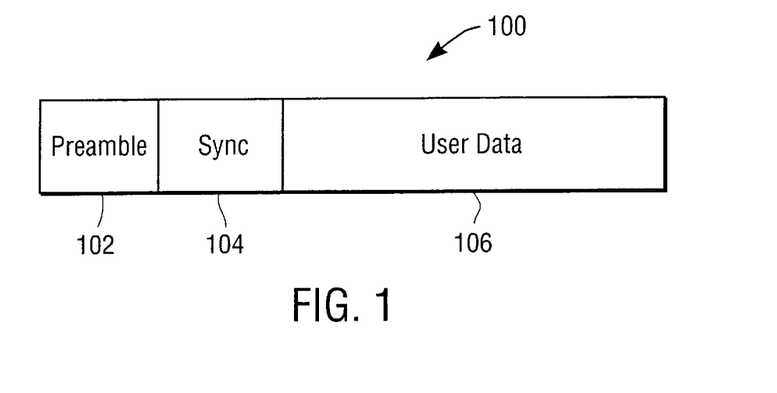
FIG. 1 is a diagram of an exemplary data format of user data.

In the case of magnetic recording, as shown in FIG. 1, data sectors 100 on magnetic disks are formatted to include an acquisition preamble 102, a sync or synchronization mark 104, and user data 106. Timing recovery uses the acquisition preamble 102 to acquire the correct sampling frequency and phase before reading the user data 106. The synchronization mark 104 demarcates the beginning of the user data. The preamble pattern is periodic, having period $4T_s$, where $T_s$ is the bit period.

The phase and frequency of the initial asynchronous samples of this waveform are unknown. The sampling phase (modulo the bit period $T_s$) can be anything, and the sampling frequency can be in error by as much as half a percent. Interpolated timing recovery includes an asynchronous phase to estimate the initial sampling phase and to initialize the interpolator appropriately using the estimate. Then, a synchronous acquisition step is used to refine the initial estimate of the phase and correct the sampling frequency.

Figure 2:
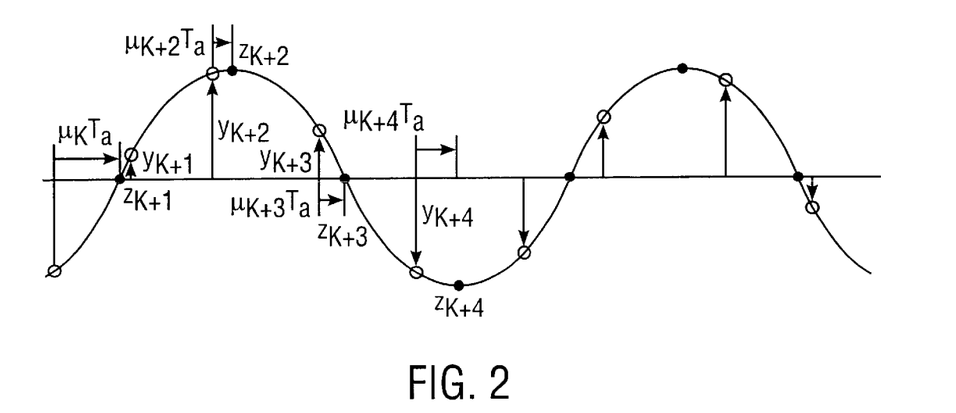
FIG. 2 is a diagram illustrating an exemplary 2T preamble and various phases.

This is illustrated more clearly with reference to FIG. 2. In particular, FIG. 2 illustrates various initial sampling phases of the 2T acquisition preamble. Points $Y_k$ on the curve 1000 are the asynchronous samples, sampled at a sampling period of $T_a$. Points $z_k$ represent the interpolated (synchronous) points, at a resampling period of $T_s$. The values $\mu_k$ represent the fractions of the asynchronous period $T_a$ at which to interpolate the next synchronous sample. The objective of zero phase restart (or asynchronous sampling) is to determine an initial interpolation interval $\mu_0$, i.e., the fraction of an asynchronous period $T_a$ after the last asynchronous sample $y_k$ at which to interpolate the first synchronous sample.

SUMMARY OF THE INVENTION

One aspect of the present invention relates to an improved asynchronous sampling system and method, i.e., an improved zero phase restart system. Another aspect of the invention relates to synchronous acquisition, i.e., determining the phase error estimate. A timing error estimation unit is provided to calculate an acquisition timing error. The estimate is based on use of synchronous (interpolated) samples and an approximation to an arctangent function.

An interpolated timing recovery system according to the present invention is simpler to implement, requires fewer signal samples, and is more robust against signal distortions such as gain errors, DC offset errors, and magneto-resistive asymmetry.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 2–9 illustrate an improved interpolated timing recovery system and method according to the present invention. Briefly, the present invention relates to an improved method for estimating the initial interpolation interval. Rather than employing an extensive series of relatively complex and time-consuming calculations, a look-up table technique is employed. The present invention further relates to determining a phase error estimate during synchronous acquisition.

Sampled Amplitude Read Channel

Figure 3:
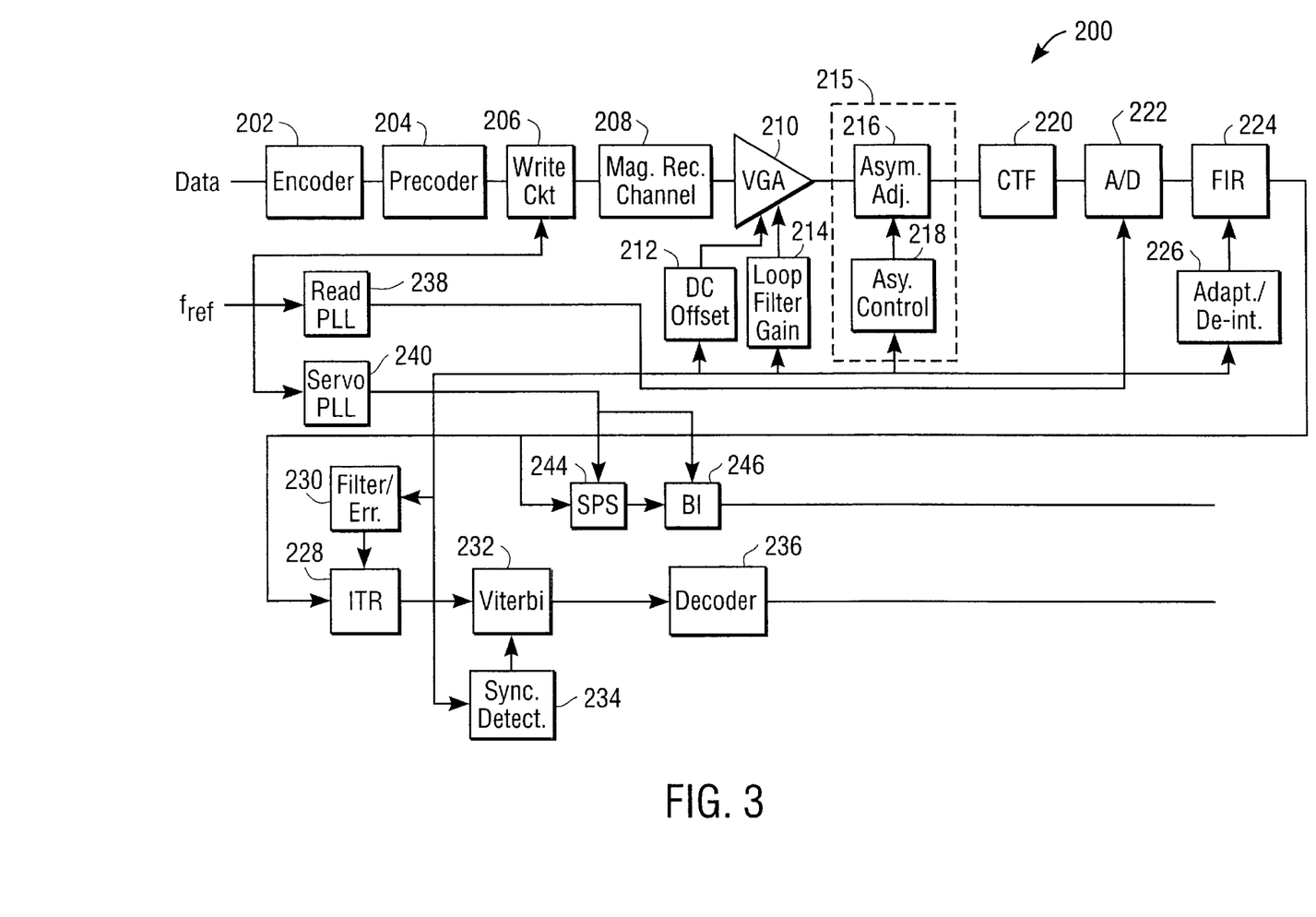
FIG. 3 is a block diagram of an exemplary read/write channel according to an embodiment of the invention.

A block diagram of a sampled amplitude read channel according to an embodiment of the invention is shown in FIG. 3 and identified by the reference numeral 200. During a write operation, data is rewritten onto the media. The data is encoded in an encoder 202, such as an RLL or other encoder. A precoder 204 precodes the sequence to compensate for the transfer function of the magnetic recording channel 208 and equalizing filters. The write circuitry 206 modulates the current in the recording head coil to record a binary sequence onto the medium. A reference frequency $f_{ref}$ provides a write clock to the write circuitry 206.

The bit sequence is then provided to a variable gain amplifier 210 to adjust the amplitude of the signal. DC offset control 212 and loop filter/gain error correction 214 may be provided to control the adjustment of the VGA 210. Further, an asymmetry control unit 215 including an asymmetry adjustment unit 216 and asymmetry control 218 may be provided to compensate for magneto-resistive asymmetry effects.

The signal is then provided to a continuous time filter 220, which may be a Butterworth filter, for example, to attenuate high frequency noise and minimize aliasing into baseband after sampling. The signal is then provided to an analog to digital converter 222 to sample the output of the continuous time filter 220.

A finite impulse response filter 224 provides additional equalization of the signal to the desired response. The output of the FIR 224 is provided to an interpolated timing recovery unit 228 according to the present invention which is used to recover the discrete time sequence. The output of the interpolated timing recovery unit is used to provide a feedback control to the DC offset control 212, the gain error 214, the asymmetry control 218 and the FIR 224 control 226. The output of the interpolated timing recovery 228 is provided to a Viterbi detector 232 to provide maximum likelihood detection. The ITR output is provided to a sync detector 234 which is used to detect the sync mark using phase information gleaned from having read the immediately preceding preamble. This information is then provided to the Viterbi detector 232 for use in sequence detection. The Viterbi detector output is then provided to the decoder 236 which decodes the encoding provided by the encoder 202.

Interpolated Timing Recovery Unit

Figure 4:
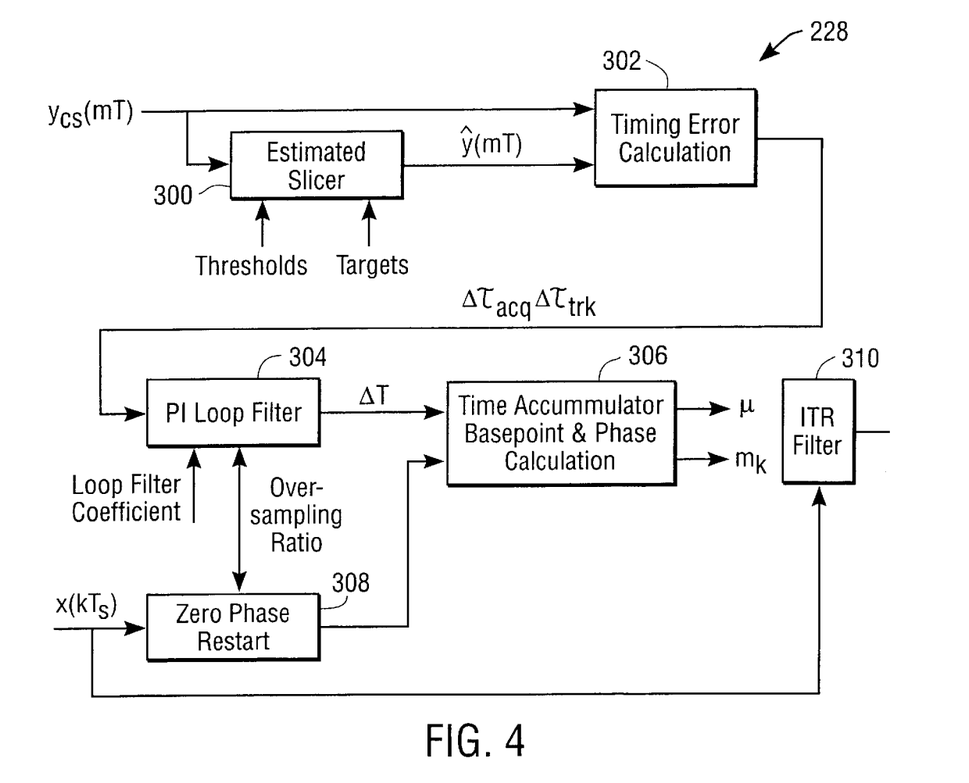
FIG. 4 is a block diagram of an exemplary interpolated timing recovery unit according to an embodiment of the invention.

Acquisition timing according to the present invention is accomplished in the interpolated timing recovery unit 228. An exemplary interpolated timing recovery unit according to the present invention is shown in FIG. 4. The ITR unit 228 receives interpolated data y(t), which is provided to an estimator/slicer 300 and to a timing error estimator 302. An exemplary estimator/slicer 300 is described in U.S. application Ser. No. 09/480,314, filed Jan. 10, 2000, and is incorporated herein by reference.

As will be explained in greater detail below, during timing acquisition, the timing error estimator 302 determines an estimated phase error between the actual interpolated sample time and the ideal interpolated sample time. The timing error estimator 302 provides its timing error output to a loop filter 304. The loop filter 304 filters the phase error to generate a frequency offset that settles to a value proportional to a frequency difference between the synchronous and asynchronous frequencies. The loop filter 304 provides its output to the time accumulator and phase calculation unit 306. The time accumulator and phase calculation unit 306 determines succeeding values for the interpolation interval $\mu_k$. The output of the time accumulator and phase calculator 306 is provided to the ITR filter 310.

As will be explained in greater detail below, a zero phase restart unit 308 according to the present invention is provided for determining an initial interpolation interval $\mu_0$. The zero phase restart circuit 308 provides its output $\mu_0$ to the time accumulator and phase calculator 306.

Loop Filter

The loop filter 304 may take a variety of forms. One particular implementation of the loop filter 304 employs a proportional and integral term (PI) of the form:

$$L(z) = A + \frac{B}{(1-z^{-1})}.$$

It is noted, however, that the loop filter may take a variety of other forms. Thus, the form shown above is exemplary only.

Time Accumulator and Phase Calculation

The time accumulator and phase calculation unit 306 accumulates the frequency offset signal at the output of the loop filter 304:

$$\mu_i = \sum_{k \leq i} \Delta \mu_k$$

where $\Delta \mu_k$ is the output of the loop filter and $\mu_i$ is the fractional part of the cumulative sum of the $\Delta \mu_k$.

Asynchronous Acquisition (Zero Phase Restart)

The zero phase restart unit 308 computes an initial resampling phase $\mu_0$ from a sequence of four successive asynchronous samples $y_0$, $y_1$, $y_2$, and $y_3$. The following formula approximates the phase (relative to the period $4T_s$, sinusoidal preamble signal) of the last asynchronous sample $y_3$:

$$\varphi = \tan^{-1}\left(\frac{y_2 - y_0}{y_3 - y_1}\right) - \delta\pi$$

where $\delta = (T_s - T_a)/T_a$ is the oversampling margin, and the synchronous samples are ideally taken at the phases 0, $\pi/2$, $\pi$, and $3\pi/2$ as is the case for any equalization target where the 2T preamble pattern is sampled at zero crossings. Then, an approximation for $\mu_0$, the fraction of an asynchronous period $T_a$ after the last asynchronous sample $\mu_3$ at which to interpolate the first synchronous sample is made. The approximation $\mu_0$ is given by:

$$\mu_0 = (1 - 2\varphi/\pi)(1+\delta)(\bmod 1)$$

where $$0 \leq \mu_0 < 1$$

If the above equation for $\phi$ is used, then $\mu_0$ depends on the asynchronous data stream only through the quotient $(y_2-y_0)/(y_3-y_1)$ As such, $\mu_0$ may be approximated with a look-up table that is addressed according to the outcome of several comparisons of the form $$a(y_2-y_0) < b(y_3-y_1)$$

where a and b are small integers. In one embodiment, the quotient is compared to each of the fractions b/a: 1/16, 1/8, 1/4, 3/8, 1/2, 3/4, 1, 4/3, 2, 8/3, 4, 8, and 16: The fractions are chosen for computational simplicity and to minimize the maximum error in the calculated value of $\mu_0$ over its range of values. Then one of fourteen (14) values of $\mu_0$ is returned by the lookup operation, according to which of the fourteen intervals (having these thirteen boundary points) the quotient falls in. For example, the table can be designed so as to output the average of the two values of $\mu$ calculated using the two endpoints $b_1/a_1$ and $b_2/a_2$ whenever the quotient $(y_2-y_0)/(y_3-y_1)$ falls anywhere between these two endpoints. Using this procedure with $\delta=0.0625$ and rounding $\mu$ to eight unsigned bits, the following table (normalized to 256=1) is obtained: (45, 34, 18, 254, 235, 210, 182, 158, 130, 105, 86, 66, 50, 39).

This method of approximating $\mu_0$ by first approximating the quotient has the virtue of being robust against both gain and offset errors in the received signal.

Figure 5:
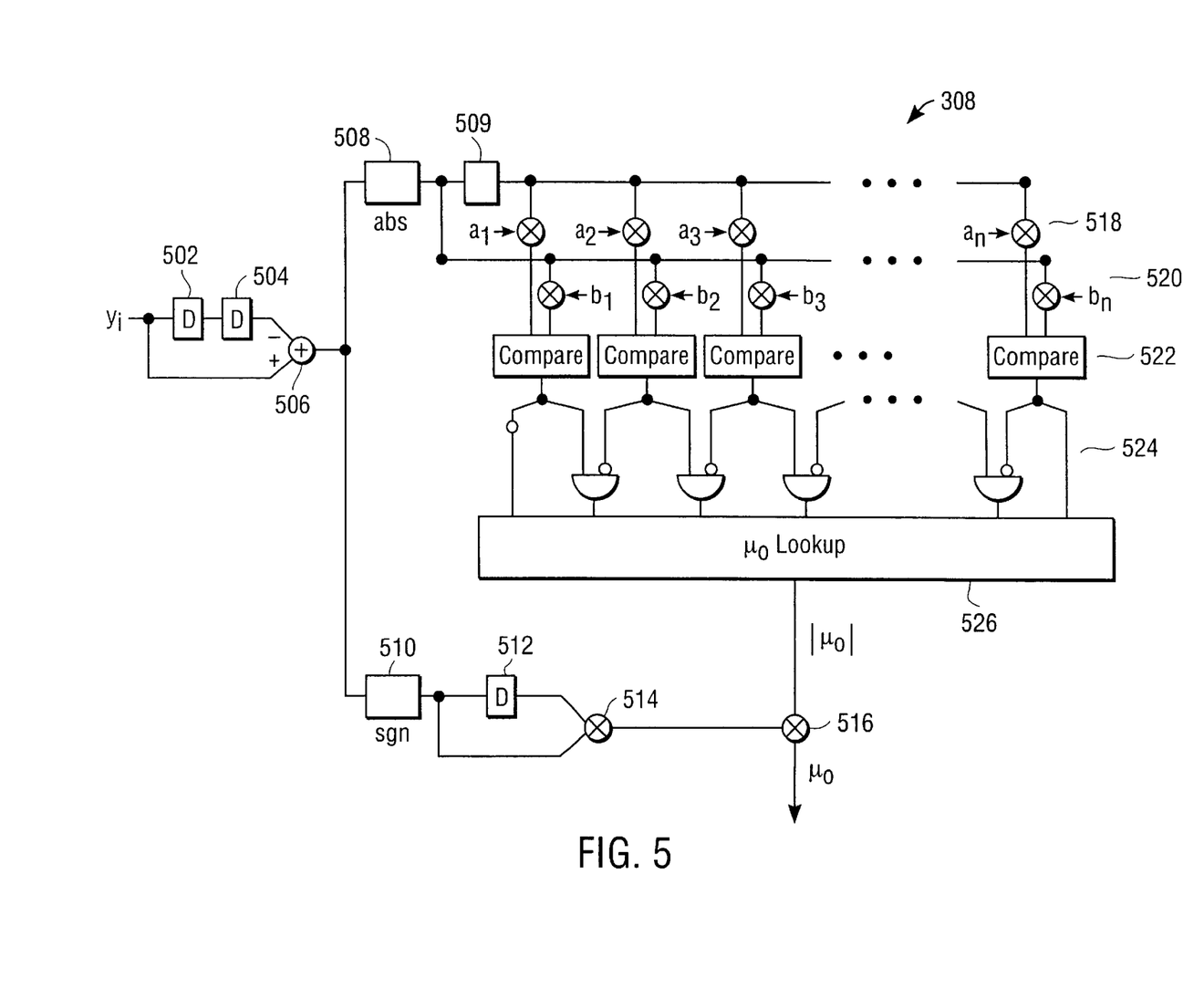
FIG. 5 is a diagram of an exemplary zero phase restart unit according to an embodiment of the invention.
Figure 6:
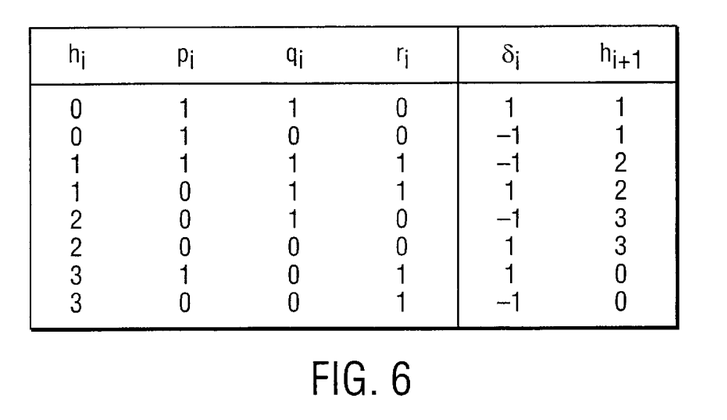
FIG. 6 is a table of exemplary hysteresis values.

An exemplary implementation of the zero phase restart unit 308 is shown in FIG. 5. As illustrated, as signal stream $Y_i$ is provided to a pair of delay operators 502, 504 and then an arithmetic operator 506. The output of the arithmetic operator 506 is $y_i - y_{i-2}$. Along one branch, the output of the arithmetic operator 506 is provided to a signum operator 510 and then a delay operator 512. The output of the delay operator 512 and the signum operator 510 are provided to a multiplier 514. As will be described in greater detail below, the output of the multiplier 514 is used to determine the sign of $\mu_0$.

The output of the arithmetic operator 506 is provided to an absolute value unit 508. The output of the absolute value unit 508 is provided to a bank of multipliers 520, which multiply $|y_i - y_{i-2}|$ with the factors $b_n$. The output of the absolute value unit is also provided to another delay operator 509, the output of which, $|y_{i-1} - y_{i-3}|$ is provided to a multiplier bank 518. The multiplier bank 518 multiplies the output $|y_{i-1} - y_{i-3}|$ with the factors $a_n$. The resulting outputs of the multiplier banks 518, 520, are provided to a comparator bank 522. The comparators of the comparator bank 522 perform the comparisons a $|y_{i-1} - y_{i-3}| < b\ |y_i - y_{i-2}|$. The results of the compare operations are provided to a bank of AND gates 524, which select the appropriate value for $|\mu_0|$ from the lookup table 526. The signed value for $\mu_0$ is determined by multiplying the output of the multiplier 514 with $|\mu_0|$ in the multiplier 516.

Synchronous Acquisition

During synchronous acquisition, the phase error estimate $\Delta_{pl}$ is calculated using four successive synchronous samples $z_i, z_{i+1}, z_{i+2}, z_{i+3}$. These samples are interpolated values of the signal. For EPR4 equalization, each of these samples should sample the period $4T_s$ sinusoidal preamble at one of the phases $0, \pi/2, \pi,$ and $3\pi/2$. The phase error estimate is calculated as an approximation to the formula $$\Delta \tau_i = \begin{cases} \tan^{-1}\left(\frac{z_{i+2} - z_i}{z_{i+3} - z_{i+1}}\right) & \text{if } |z_{i+2} - z_i| < |z_{i+3} - z_{i+2}| \\ \tan^{-1}\left(\frac{z_{i+3} - z_{i+1}}{z_{i+2} - z_i}\right) & \text{if } |z_{i+2} - z_i| \geq |z_{i+3} - z_{i+1}| \end{cases}.$$

In one embodiment, the arctangent function is approximated by the identity function, and the quotient is approximated by a table lookup. A fast implementation approximates the magnitude of the quotient $(z_{i+2} - z_i)/(z_{i+3} - z_{i+1})$ as follows:

$$\left|\frac{z_{i+2} - z_i}{z_{i+3} - z_{i+1}}\right| = \begin{cases} 0 & \text{if } |z_{i+2} - z_i| < 2^{-n}|z_{i+3} - z_{i+1}| \\ 2^{-k} & \text{if } 2^{-k}|z_{i+3} - z_{i+1}| \leq \\ & |z_{i+2} - z_i| < |2^{-k+1}|z_{i+3} - z_{i+1}|| \end{cases}$$

where n is a fixed positive integer and i<=k<=n. The sign of the phase error estimate can be computed as the exclusive OR p', ⊕q', ⊕r', of the three Boolean variables:

$p_i = (0 \leq z_{i+3} - z_{i+1})$ $q_i = (0 \leq z_{i+2} - z_i)$ $r_i = (|z_{i+2} - z_i| < |z_{i+3} - z_{i+1}|)$.

If p', ⊕q', ⊕r', is true, then the sign is negative.

If, for whatever reason, the interpolated sampling phase error is close to $T_s/2$ in magnitude, then the sign of the phase error estimate $|\Delta\tau_I|$ is determined largely by noise. This can cause the correction to the phase to be essentially random in sign, which in turn causes the phase to remain at an unstable equilibrium value for an unacceptable period of time. This effect is known as hangup. To prevent hangup, the timing phase error estimate $\Delta\tau_I$ is adjusted under certain circumstances. This adjustment occurs when $|\Delta\tau_I|$ exceeds a fixed threshold t and the 'closest' sampling phase (according to the differences $z_{i+2} - z_i$ and $z_{i+3} - z_{i+1}$) differs from the phase predicted by the hysteresis state $h_i$ (i.e., a memory of the past sampling phase—an unsigned two bit value: 0, 1, 2, or 3) by $-\pi/2$ or $\pi/2$. Under these circumstances, $\Delta\tau_i$ is adjusted according to the present hysteresis state and the values of the Boolean variables $p_i$, $q_i$, and $r_i$, defined above. Specifically, $\Delta\tau_i$ is adjusted by adding to it the value $\delta_I$ when $|\Delta\tau_I| > t$ and the variables $h_i$, $p_i$, $q_i$, and $r_i$, take one of the combinations of values specified in the table of FIG. 6. Under these circumstances, the hysteresis state is updated according to the table. Otherwise, the next hysteresis state is computed as the unsigned two bit value $$h_{i+1} = r_i + 2((q_i \wedge r'_i) \vee (p' \wedge r_i)).$$

Figure 7:
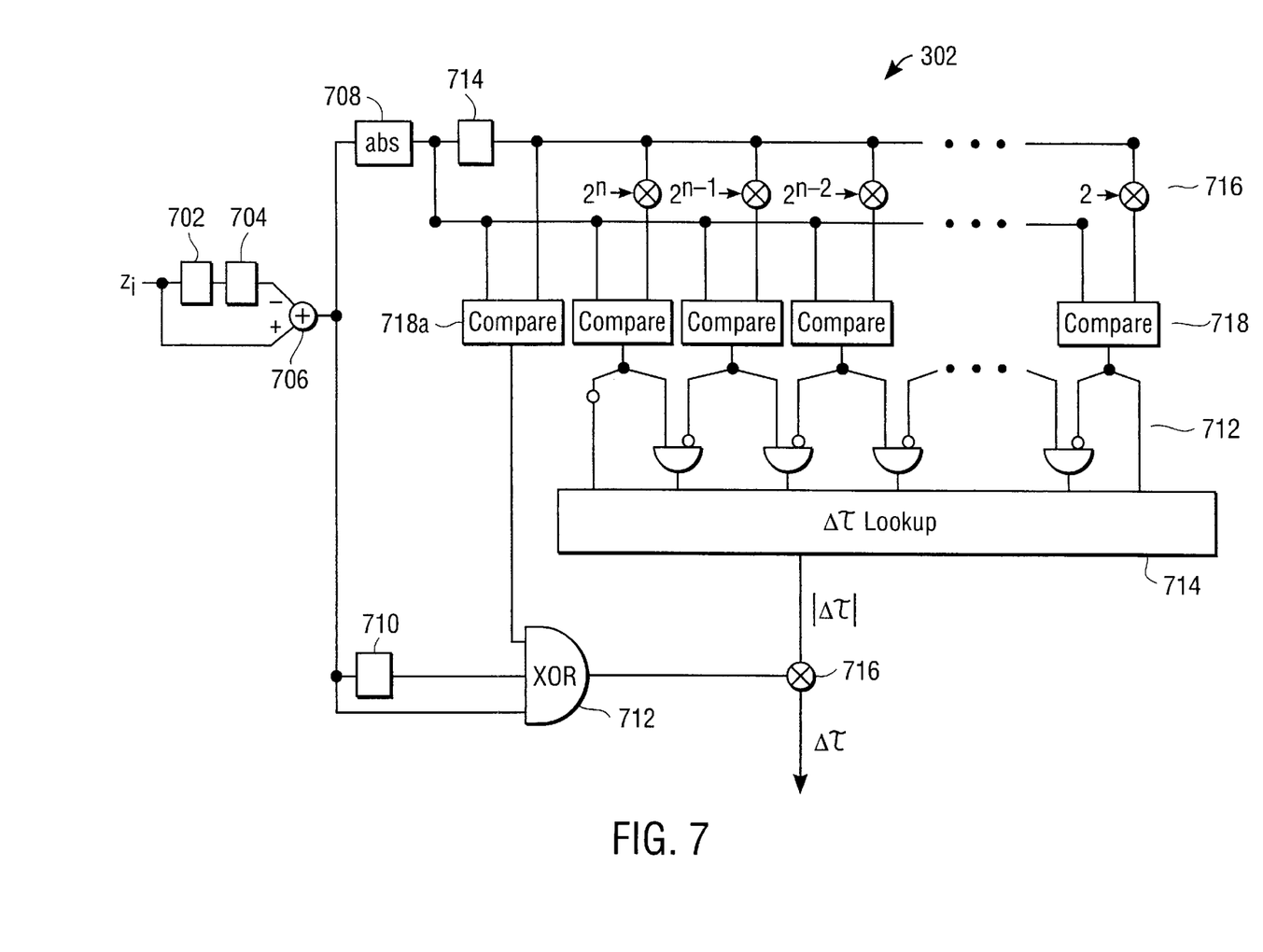
FIG. 7 is a diagram of an exemplary timing error calculation unit according to an embodiment of the invention.

An exemplary timing error calculation unit 302 is shown in FIG. 7. As illustrated, a signal stream $z_i$ is provided to a pair of delay operators and then an arithmetic operator 706. The output of the arithmetic operator 706 is $z_i - z_{i-2}$. Along one branch, the output of the delay operator is provided to an absolute value operator 708. As will be explained in greater detail below, along a second branch, the output of the arithmetic operator 706 is provided to a delay operator 710 and an XOR gate 712.

Along the first branch, the output of the absolute value operator 708 is then provided to a delay operator 714 and also to a bank of comparators 718. The output of the delay operator 714 is provided to a bank of multipliers 716, which multiply $|z_{i-1} - z_{i-3}|$ by the powers of 2. The outputs of the multipliers 716 are provided as the other inputs to the comparators 718. The results of the compare operations are provided to a lookup table 714 which determines the value of $|\Delta\tau|$.

As noted above, the output of the arithmetic operator 706 is provided to delay operator 710 and to XOR gate 712. The XOR gate 712 also receives as an input the output of an initial comparator 718a. The comparator 718a performs a comparison of $|z_{i-1} - z_{i-3}|$ and $|z_i - z_{i-2}|$. The output of XOR gate 712 is provided, along with the output of the lookup table 714 to a multiplier 716 to define the sign of $\Delta\tau$.

Interpolation Filter

Figure 8:
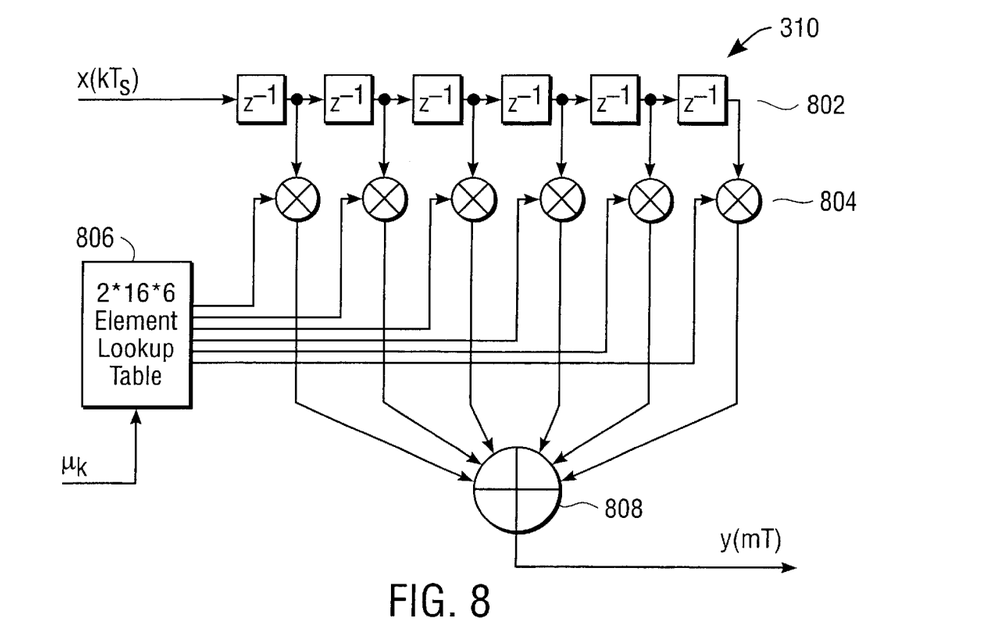
FIG. 8 is a diagram of an exemplary ITR filter according to an embodiment of the invention.
Figure 9:
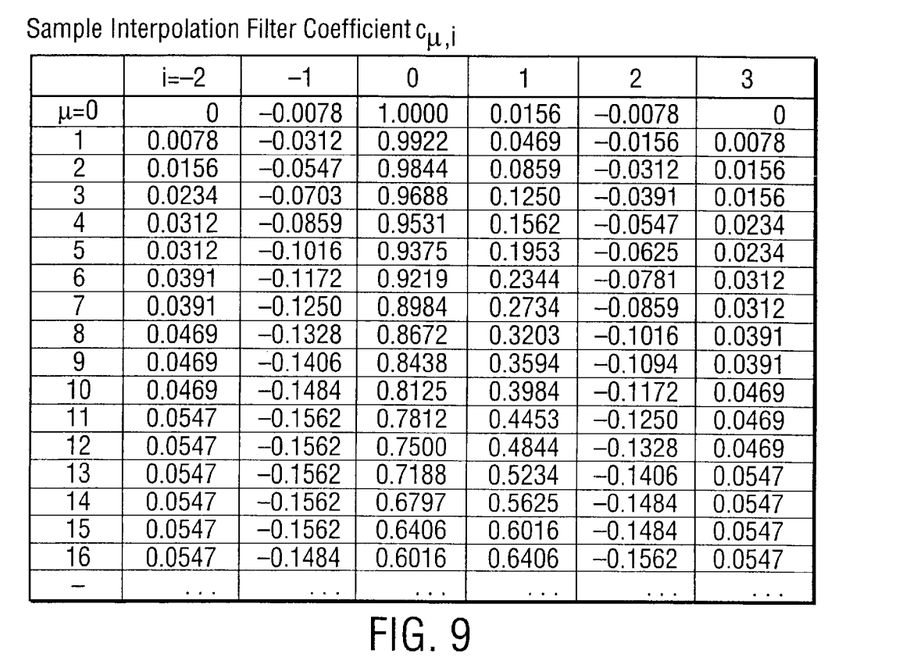
FIG. 9 is a table of coefficient values for the interpolation filter of FIG. 8.

As discussed above, once the estimates for $\mu$ are generated, they are provided to an interpolation filter 310 which generates the signal estimates. It can be shown that the interpolated samples are related to the received stream according to the following equation:

$$z_k = \sum_{i=-l+1}^{l} c_i(\mu_k) y_{k+i}$$

where the 2l interpolation coefficients $C_i(\mu_k)$ are looked up in a table according to the value of $\mu_k$. An exemplary interpolation filter 310 implementing the above equation is shown in FIG. 8 and FIG. 9. In particular, FIG. 8 shows the filter, and FIG. 9 is a table of exemplary lookup table values. Turning now to FIG. 8, the interpolation filter 310 receives a bit stream into a bank of delay operators 802. The outputs of the delay operators 802 are provided to multipliers 804 which multiply with the table 806 outputs. The results are summed back in arithmetic operator 808.

What is claimed:

1. A zero phase restart unit for determining an initial interpolation interval ($\mu_0$) for digitally resampling a stream of asynchronous samples of an analog signal, the initial interpolation interval ($\mu_0$) providing a time interval after an asynchronous sample at which a synchronous sample is interpolated, the zero phase restart circuit comprising:

circuitry configured to generate a quotient from a plurality of asynchronous samples from the series of asynchronous samples;

a comparator configured to compare the quotient to a plurality of predetermined fractions, wherein each of the predetermined fractions represents a boundary point from a plurality of boundary points, and the quotient falls between an interval defined by two of the boundary points; and circuitry configured to select the initial interpolation interval value ($\mu_0$) stored in a lookup table based on the comparison of the quotient to the plurality of predetermined fractions.

2. The zero phase restart unit of claim 1, wherein the selected initial interpolation value ($\mu_0$) is the average of two calculated values of ($\mu$) using values of two predetermined fractions associated with the two boundary points between which the quotient falls.

3. The zero phase restart unit of claim 1, wherein the plurality of predetermined fractions include 1/16, 1/8, 1/4, 3/8, 1/2, 3/4, 1, 4/3, 2, 8/3, 4, 8, and 16.

4. The zero phase restart unit of claim 1, wherein the circuitry is configured to generate a quotient $(y_2-y_0)/(y_3-y_1)$, where $y_0$, $y_1$, $y_2$, and $y_3$ are successive asynchronous samples from the series of asynchronous samples.

5. An interpolated timing recovery unit for digitally resampling a stream of asynchronous samples of an analog signal, the interpolated timing recovery unit comprising:

a zero phase restart unit configured to determine an initial interpolation interval ($\mu_0$) by generating a quotient from a plurality of asynchronous samples from the stream of asynchronous samples;

a time accumulator and phase accumulation unit configured to receive the initial interpolation value ($\mu_0$) and determine succeeding interpolation interval values ($\mu_i$); and an interpolation filter configured to generate synchronous interpolated samples based on the values of the initial interpolation interval ($\mu_0$) and the succeeding interpolation intervals ($\mu_i$), the initial interpolation interval ($\mu_0$) providing a time interval after an asynchronous sample at which a synchronous sample is interpolated.

6. The interpolated timing recovery unit of claim 5, further comprising a loop filter configured to filter an estimated phase error between an actual interpolated sample time of the interpolated samples and an ideal sample time and generate a frequency offset signal at an output of the loop filter that settles to a value proportional to a frequency difference between frequencies of the synchronous interpolated samples and the asynchrouous samples.

7. The interpolated timing recovery unit of claim 6, wherein the time accumulator and phase accumulation unit determines the succeeding interpolation values ($\mu_i$) substantially according to the following:

$$\mu_i = \sum_{k \leq i} \Delta\mu_k$$

where $\Delta\mu_k$ is the output of the loop filter and $\mu_i$ is a fractional part of a cumulative sum of the output of the loop filter ($\Delta\mu_k$).

8. The interpolated timing recovery unit of claim 5, wherein the zero phase restart circuit is configured to generate a quotient $(y_2-y_0)/(y_3-y_1)$, where $y_0$, $y_1$, $y_2$, and $y_3$ are successive asynchronous samples from the series of asynchronous samples.

9. A sampled amplitude read channel, comprising:

a magnetic recording channel; and an interpolated timing recovery unit, the interpolated timing recovery unit including a zero phase restart unit, the zero phase restart unit configured to generate an initial interpolation interval ($\mu_0$) by determining a quotient from a plurality of asynchronous samples from a series of asynchronous samples of a signal from the magnetic recording channel and comparing the quotient to a plurality of predetermined fractions, wherein each of the predetermined fractions represents a boundary point from a plurality of boundary points, and the quotient falls between an interval defined by two of the boundary points, the initial interpolation interval ($\mu_0$) providing a time interval after an asynchronous sample at which a synchronous sample is interpolated.

* * * * *